PATENTED JAN 26 1971  3,558,064

INVENTORS
Carl-Helmut Dederra,
Manfred Lechner,
Werner Malburg

United States Patent

[11] 3,558,064

| [72] | Inventors | Carl-Helmut Dederra;<br>Manfred Lechner, Munich; Werner<br>Malburg, Ottobrunn, Germany |
|---|---|---|
| [21] | Appl. No. | 828,014 |
| [22] | Filed | May 26, 1969 |
| [45] | Patented | Jan. 26, 1971 |
| [73] | Assignee | Bolkow Gesellschaft mit beschran-Kter<br>Haftung Postabholfact, Munich, Germany |
| [32] | Priority | June 12, 1969 |
| [33] | | Germany |
| [31] | | B82384 |
| | | Continuation of application Ser. No.<br>555,068, June 3, 1966, now abandoned. |

[54] INJECTION PROPULSION DEVICE
7 Claims, 6 Drawing Figs.

[52] U.S. Cl. .................................................... 239/544,
239/559, 239/566
[51] Int. Cl. ...................................................... B05b 1/26
[50] Field of Search ........................................... 239/566,
543—545, 265.11—265.43; 60/39.74

[56] References Cited
UNITED STATES PATENTS
3,413,810  12/1968  Kaufmann ..................  60/258

*Primary Examiner*—Lloyd L. King
*Attorney*—McGlew and Toren

ABSTRACT: An injection device or conduit for injecting liquid fuel components into a gaseous fuel component which traverses a combustion chamber of a jet propulsion engine includes a single trough-shaped member having an open end which is closed by a planar member. The planar member includes at least one bore drilled therethrough which extends substantially perpendicular to the surface of the planar member and forms an injection orifice. The trough-shaped member may be substantially V-shaped in cross section or U-shaped or even partially cylindrical. The planar member may be a flat plate or a plate having at least two portions extending obliquely from each other to form an obtuse angle with respect to each other. In one embodiment, the planar member includes a wall portion forming a partition in said trough member dividing it into two separate channels or, as in another embodiment, the planar member includes two wall portions dividing the trough-shaped member into three flow channels.

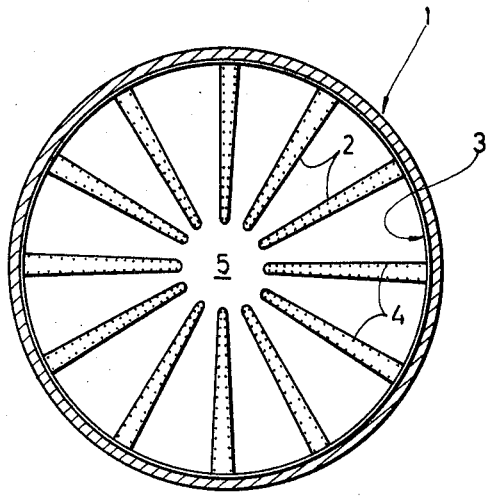

3,558,064

INJECTION PROPULSION DEVICE

This application is a continuation of U.S. Pat. application Ser. No. 555,068 filed June 3, 1966, now abandoned.

SUMMARY OF THE INVENTION

This invention relates, in general, to the construction of jet propulsion units and, in particular, to a new and useful injection device or conduit for injecting the liquid fuel components into a gaseous fuel component traversing the combustion chamber and to a method of forming the injection conduit.

The present invention is particularly applicable for the construction of jet propulsion units where one or more mostly liquid fuel components are injected from lines or conduits which are arranged in grid form and include injection orifices which extend along an axis for directing the liquid fuel components into a gaseous fuel component which is traversing the combustion chamber. Such gaseous fuel components are, for example, the air portion in the combustion chambers of TL propulsion units or ram jets, hot gas in the afterburner of TL propulsion units, or gaseous and preburnt fuels, respectively, in rocket combustion chambers. The injection of the liquid fuels is effected as a rule by means of one channel line of simple form and arrangement which have a favorable flow profile. The injection orifices in the lines are designed as special inserted nozzles or as simple bores drilled through the fuel lines.

Nozzle inserts have the advantage that they can be adapted particularly well to their respective use and they are easy to machine. They can be secured by screwing, welding or similar methods on the injection lines which must be provided with corresponding recesses for this purpose. It is known to design the bores which are required, in any event, so that their direction and dimension can serve directly as injection orifices. This means that a considerable simplification of the injection lines may be accomplished but it results in some of the following difficulties.

In order to avoid flow losses, it is necessary to remove the burrs on the inside of the injection bores and to round them off. This is not possible, however, in closed lines with the diameters which are usually involved. In order to improve and upgrade the fuel, two or more jets are frequently directed so that they may collide. When several jets from a single line are to collide in a single point, it is necessary to use special devices for drilling the injection orifices or it is necessary to provide before the drilling, small plane surfaces perpendicular to the bores by grinding or milling, since curved line walls could not be drilled in any other manner.

If different fuels are to be injected through a single grid, it is necessary in single channel lines or single flow lines to conduct the fuels in separate juxtaposed channels or lines. The upgrading by effecting collision of the fuel exiting from the various lines is rendered difficult by the fact that the intervals between the cooperating lines are irregular in some grid forms, and are generally too great.

In accordance with the present invention, there is provided an injection line for one or more fuels which is formed from two separate plate element types, for example, a curved or bent trough-shaped bar or plate and at least one second bar with a plane surface. With the invention arrangement, it is possible to improve injection lines in such a way that their machining and thus the use of bores as injection orifices may be made possible. In addition, the construction may be such that a satisfactory collision upgrading of one or several fuels is insured using a simple construction. The problem is solved by using the two types of interconnecting parts or members which are arranged together to form a closed single or multiple channel fuel line. For this purpose, there is required at least one trough-shaped and at least one second planar member having at least one planar surface. The members are united in such a way that each flow channel is provided with injection bores which are arranged on the plane surfaces of the planar member. The trough-shaped members which are hereafter referred to as A-members, from the flow channel proper which is closed by a planar member or B-member, which may form an outer wall and a partition wall in some embodiments. The injection orifices are drilled preferably perpendicularly into the plane surfaces of the B-member before it is assembled with the A-member. In this manner, fuel lines of very simple construction may be easily manufactured.

An improvement regarding the upgrading of fuel is achieved by bending the planar of B-member in a longitudinal direction to form down-current angular portions at each end which are arranged at the same angle. The resultant vertical jet which exits from holes drilled through the planar surfaces will form an angle with each other so that the jets meet centrally at an angle corresponding to the bending angles of the plate portions. In accordance with another feature of the invention, separate fuel channels or lines are provided within a single construction using two geometrically similar A-members of different dimension which are arranged one within the other at spaced locations from each other and using a plane B-member which closes the ends between the assembled A-members. In this way, two channels may be formed of which one partly surrounds the other. Each channel may have separate feed lines and regulating elements, and the inner channels can be connected or disconnected in order to achieve regulation of the propulsion unit, for example. The outer channel will also provide a cooling of the entire line even when the inner channel is disconnected.

According to a still further feature of the invention, a conduit is provided using an A-member and a B-member which is provided with a plurality of planar surfaces extending outwardly at an angle from each other which is arranged within the B-member to subdivide the space therewithin into a plurality of fuel channels or flow passages. With such construction, it is possible to connect the individual channels to different fuel components and a good mixing of the fuel components can be achieved in a simple manner by the collision of the jets of fuels upon discharge since the cooperating bores are arranged in one line and always have the same distance from each other.

Accordingly, it is an object of the invention to provide an improved conduit construction for the injection of liquid fuels in jet propulsion devices using a curve-shaped or trough-shaped construction element and a planar construction element to close the trough-shaped element and form the fuel line, and wherein the planar element is provided with a plurality of bores defined therethrough.

A further object of the invention is to provide a simple fuel line injection construction in which one or more of a plurality of trough-shaped members are joined together with a planar member to form one or more fuel passages with bores being defined in the planar surfaces which may be arranged, for example, to provide for separate nozzle discharge from each of the flow passages or combined discharge along parallel or intersecting pairs.

A further object of the invention is to provide an injection device for jet propulsion unit which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

IN THE DRAWING

Figure 1:
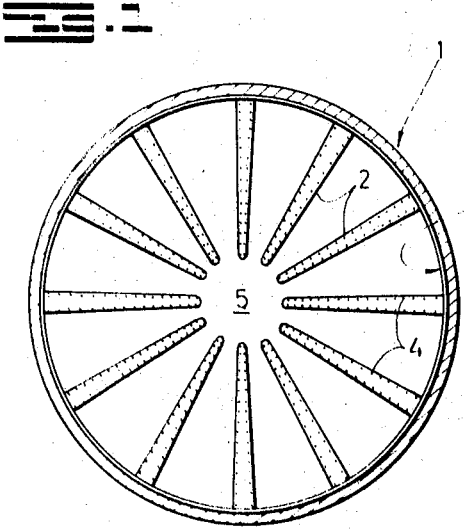
FIG. 1 is an elevational view of a fuel injection grid seen from the nozzle end of a combustion chamber.
Figure 2:
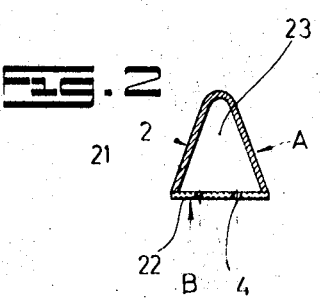
FIG. 2 is a transverse sectional view of a fuel injection conduit as indicated in FIG. 1.

Referring to the drawings, in particular, the invention embodied therein in FIGS. 1 and 2 includes a fuel injection device 1 in which a plurality of fuel injection conduits 2 are arranged to protrude radially into a radial combustion chamber 5 which is defined by cylindrical walls 3. The construction indicated includes a grid arrangement in which substantially the entire cross section of the combustion chamber 5 is covered so that the entire gas current leaving the turbine must pass through the grid. Each of the fuel lines 2 normally is constructed to be inserted through the wall 3 of the combustion chamber and to be connected on the exterior of the wall to fuel line (not represented). Each of the conduits 2 is provided with a plurality of injection orifices 4 which in the embodiment illustrated includes two rows of such orifices.

In accordance with the invention as indicated in FIG. 2, the conduits 2 are advantageously formed of two members, a trough-shaped member generally designated A in each embodiment and a planar member generally designated B in each embodiment which has at least one flat plate portion or planar portion. In the embodiment of FIG. 1 the trough-shaped member A is of substantially V-shaped cross section and it is designated 21 and the planar member B is designated 22. The cross section of the member A is substantially V-shaped and the outer end thereof is closed by the member B to form a flow channel 23. A feature of the invention is that bores 4 are defined in the member 22 before it is joined to the member 21. The bores may be drilled perpendicularly through the single planar surface of the member 22.

Figure 3:
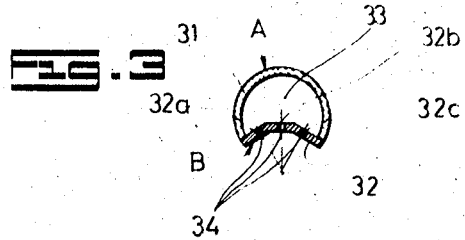
FIGS. 3 to 6 are views similar to FIG. 2 of other embodiments of the invention.

In the embodiment of FIG. 3, an A-member 31 is provided which is of circular configuration. A B-member 32 is formed with three separate planar portions 32a, 32b and 32c. In this embodiment, orifices 34 are drilled perpendicularly through each of the planar surfaces. The orifices are located so that the jets of fuel which exit therefrom when the device is in operation will intersect, as indicated by the dot-and-dash lines.

Figure 4:
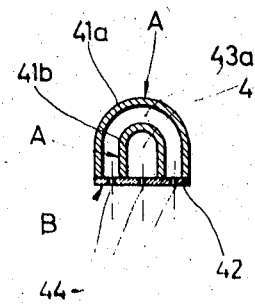

In the embodiment of FIG. 4, the member A comprises two A-bar members of similar geometrical configuration but of different dimensions arranged one within the other but spaced apart in order to form separate flow channels 43a and 43b. The A member comprises two concentrically arranged V-shaped members designated 41a for the exterior member and 41b for the interior member. The outer ends of the members 41a and 41b are closed by a B member which comprises single plate or planar member 42. In this embodiment, orifices 44 are drilled perpendicularly through the planar surface of the member 42 at locations to provide for nozzle ejector members at each end of the flow channel 43a and centrally for the interior flow channel 43b. A feature of the construction of FIG. 4 is that when the inner channel 43b is disconnected and no fuel is flowing therethrough, this line will be cooled by the surrounding outer channel 43a through which the fuel continues to be circulated.

Figure 5:
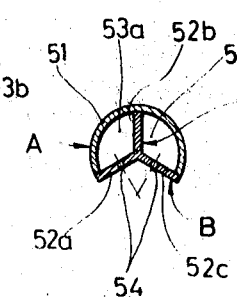

In FIG. 5, there is provided an A member of substantially circular configuration similar to that of FIG. 3 and designated 51 and a B member 52 having three intersecting planar surfaces 52a, 52b and 52c which are arranged at equal angular relationships. The central planar surface 52b forms a partition and divides the interior of the A member into two flow channels 53a and 53b. The other planar surfaces 52a and 52c are provided with perpendicular bores 54 defined therethrough which function as orifices for the ejection of fuel from the associated conduits.

Figure 6:
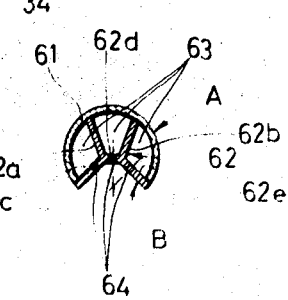

In FIG. 6, an A member comprises a partially circular cross sectioned tube 61 and a B member comprises a member 62 having partition wall planar surfaces 62a and 62b, and ejector wall planar surfaces 62c, 62d and 62e, each of which is provided with a perpendicularly extending bore forming an ejector nozzle 64. The partition walls 62a and 62b divide the interior of the A member 61 into three separate flow channels 63 for three different fuel components. In the embodiments of FIGS. 5 and 6, the fuel components may be intermixed when they are ejected through the nozzles 54 and 64, respectively, to intersect, as indicated by the dot-and-dash line.

While specific embodiments of the invention have been shown and described in detail to illustrate the application of the inventive principles, it will be understood that the invention may be embodied otherwise departing from such principles.

We claim:

1. An injection device for the combustion chamber of jet propulsion unit comprising an annular propellant supply duct of a size to conform to the interior wall of the combustion chamber, at least one separate, single trough-shaped member having an open end connected at said supply duct and extending inwardly therefrom, and a planar member joined to the trough-shaped member and closing the end thereof and forming a fuel conduit therewith, said planar member having two planar portions each with a planar surface with a bore drilled therethrough substantially perpendicular to the surface thereof forming an injection orifice, said planar member including a wall portion forming a partition dividing the interior of said trough-shaped portion into two flow conduits, said planar portions closing each of said conduits.

2. An injection device, according to claim 1, wherein said planar member includes at least two portions which are planar and which extend obliquely and form an obtuse angle with each other, said portions each having a bore defined substantially perpendicularly to the surface thereof for the discharge of fuel so that the jets of fuel discharged therefrom intersect centrally therebetween.

3. An injection device, according to claim 1, wherein said trough-shaped member is substantially circular in section and said planar member has at least two wall portions extending obliquely and arranged at an obtuse angle to each other, each of said end portions having a bore defined therethrough which extends substantially perpendicular to the surface thereof forming an injection orifice.

4. An injection device, according to claim 1, wherein said planar member has a central flat portion and two end portions extending downwardly from said central flat portion at an angle, each of said central flat portion and end portions having a bore defined therethrough which extends substantially perpendicular to the surface thereof, said bores being arranged to direct fuel which travels therethrough along paths which will intersect centrally.

5. An injection device, according to claim 1, wherein said planar portions closing each of said conduits extend at an angle from each other, with the bores defined therethrough arranged so that their center lines intersect.

6. An injection device, according to claim 1, wherein said planar member has two spaced wall portions forming separate partitions at the interior of said trough-shaped member dividing said member into at least three separate flow passages, said planar member further including planar portions closing the bottom ends of said flow passages and each having a bore defined through said portions closing the end of said flow passages which extend substantially perpendicular to the surface thereof.

7. An injection device, according to claim 6, wherein said bores are arranged so that their center lines intersect centrally.